United States Patent
Venkatesh et al.

(10) Patent No.: US 10,733,342 B2
(45) Date of Patent: Aug. 4, 2020

(54) SYSTEM AND METHOD FOR HIERARCHICAL POWER VERIFICATION

(71) Applicant: Synopsys, Inc., Mountain View, CA (US)

(72) Inventors: Shekaripuram V. Venkatesh, Los Altos, CA (US); Nitin Sharma, Noida (IN); Sanjay Gulati, New Delhi (IN); Parul Bhatia, New Delhi (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/136,033

(22) Filed: Sep. 19, 2018

(65) Prior Publication Data
US 2019/0018913 A1    Jan. 17, 2019

Related U.S. Application Data

(63) Continuation of application No. 14/815,302, filed on Jul. 31, 2015, now abandoned.
(Continued)

(51) Int. Cl.
*G06F 17/50* (2006.01)
*G06F 30/327* (2020.01)
*G06F 119/06* (2020.01)

(52) U.S. Cl.
CPC ........ *G06F 30/327* (2020.01); *G06F 2119/06* (2020.01)

(58) Field of Classification Search
CPC ............... G06F 2217/78; G06F 17/505; G06F 17/5045; G06F 2217/84; G06F 17/5022;
(Continued)

(56) References Cited

U.S. PATENT DOCUMENTS

| 6,212,665 B1 | 4/2001 | Zarkesh et al. |
| 7,134,100 B2 | 11/2006 | Ravi et al. |

(Continued)

OTHER PUBLICATIONS

United States Office Action, U.S. Appl. No. 14/815,302, dated Feb. 9, 2018, 12 pages.
(Continued)

*Primary Examiner* — Nghia M Doan
(74) *Attorney, Agent, or Firm* — Fenwick & West LLP

(57) ABSTRACT

A hierarchical power verification system and method creates abstract models of power behavior of modules that it successfully verifies. The abstract models simplify the module definition by omitting internal module details but provide sufficient information for power verification of higher level modules that incorporate this abstracted module. Design blocks are replaced with these abstract power models, resulting in reduced run-time and memory requirements. The power models can include power switches inside the block, related supplies of logic ports, supply power states, system power states, power management devices such as isolation logic and level shifters, feed-through and floating ports. The power model may be expressed either in UPF or as a combination of liberty model and UPF. After replacing modules with abstracted models the HPVS can quickly verify an entire SoC with a small memory footprint. When a user modifies a module, the HPVS need only verify the changed module and related modules at higher levels of module hierarchy.

20 Claims, 5 Drawing Sheets

Related U.S. Application Data

(60) Provisional application No. 62/189,453, filed on Jul. 7, 2015.

(58) Field of Classification Search
CPC . G06F 17/5081; G06F 30/327; G06F 2119/06
USPC .................. 716/103, 106, 108–111, 120
See application file for complete search history.

(56) References Cited

U.S. PATENT DOCUMENTS

| | | | |
|---|---|---|---|
| 7,954,078 B1* | 5/2011 | Wang | .............. G06F 17/505 |
| | | | 716/106 |
| 7,958,475 B2 | 6/2011 | Khan | |
| 8,086,980 B2 | 12/2011 | Vogel | |
| 8,176,453 B2 | 5/2012 | Yang et al. | |
| 8,407,635 B2 | 3/2013 | Chopra | |
| 8,448,112 B1 | 5/2013 | Kashai et al. | |
| 8,458,116 B2 | 6/2013 | Lupertini | |
| 8,516,422 B1 | 8/2013 | Wang | |
| 8,732,636 B2 | 5/2014 | Ginetti et al. | |
| 8,762,906 B2 | 6/2014 | Ginetti et al. | |
| 8,832,615 B2* | 9/2014 | Hsieh | .............. G06F 17/5009 |
| | | | 716/106 |
| 8,839,164 B2 | 9/2014 | Kavalipati et al. | |
| 8,943,451 B2* | 1/2015 | Dwivedi | .............. G06F 17/5081 |
| | | | 716/106 |
| 2002/0138809 A1 | 9/2002 | Roethig et al. | |
| 2007/0276645 A1 | 11/2007 | Veller et al. | |
| 2010/0192115 A1 | 7/2010 | Yang et al. | |
| 2013/0297280 A1 | 11/2013 | Feng et al. | |
| 2014/0107999 A1* | 4/2014 | Frenkil | .............. G06F 30/20 |
| | | | 703/17 |
| 2015/0178417 A1 | 6/2015 | Tu | |

OTHER PUBLICATIONS

United States Office Action, U.S. Appl. No. 14/815,302, dated Jul. 10, 2017, 19 pages.
United States Office Action, U.S. Appl. No. 14/815,302, dated Oct. 31, 2016, 15 pages.

* cited by examiner

SYSTEM AND METHOD FOR HIERARCHICAL POWER VERIFICATION

CROSS-REFERENCE TO RELATED APPLICATION

This application is a continuation of U.S. application Ser. No. 14/815,302, filed Jul. 31, 2015, now abandoned; which claims priority under 35 U.S.C. 119(e) from prior U.S. provisional Application No. 62/189,453, filed Jul. 7, 2015. All of the foregoing are incorporated by reference herein in their entirety.

TECHNICAL FIELD

This invention relates to the field of integrated circuits verification and in particular to verification of power subsystems. More particularly the invention relates to a system, method and computer program product for efficiently verifying the power subsystems of large system-on-a-chip designs.

BACKGROUND ART

Low power consumption in a SoC (System on Chip) is increasingly important. SoC designs incorporate many techniques to reduce power consumption. One technique is for the designer to use multiple voltage levels, since the voltage needs to be high only for high frequency modules of the SoC, and low voltage levels reduce power consumption. Modules of a SoC that have voltages powering them that are different from the voltages powering some other module to which they are connected are called Voltage Domains. Another technique to reduce power consumption is to turn power off completely from a module during the time that it does not need to be powered. Voltage domains one or more of whose supply voltages is dynamically turned ON/OFF are called Power Domains. Turning power OFF completely is becoming more effective compared to clock disabling as circuit design rules shrink and the leakage current increases compared to the switching current.

These modern techniques along with others create new requirements in the SoC design. Some of these requirements are:
- A level shifter is needed between the output port of a module that is connected to the input port of another module whenever the two ports (that is, the logic connected to the two ports) are powered with a different voltage.
- A register-state retention and restore circuit may be needed for critical registers of a module when the power to a module is removed.
- Isolation circuits are needed following an output port of a module whose power is turned off (port floats) and the port is connected to an input port of a module that is powered.
- Logic circuits for dynamically turning power on/off on some or all of the power ports of some or all the modules need to be added.

SoC developers normally specify the power architecture (definition of voltage/power domains, use of retention registers and more) in separate files from the logic design specification. The power architecture specification is usually called the "power intent" (PI) and is expressed in languages like Unified Power Format (UPF), described in the IEEE Standard for Design and Verification of Low-Power Integrated Circuits. This IEEE standard establishes a format used to define the power intent for electronic systems and electronic intellectual property (IP). The format provides the ability to specify the power supply network, switches, isolation, retention, and other aspects relevant to power management of an electronic system. The standard defines the relationship between the power intent specification and the logic design specification captured via other formats (e.g., standard hardware description languages (HDLs)).

A SoC may have many independent modules, each powered by multiple, different power supplies, many of which are common to more than one module. At a given time, a power supply can be turned on, turned off or be in a different state such as sleeping or idle. A power state table (PST) is a table with columns for all the voltages powering a module and rows for all the allowed combinations of power supply states.

Electronic design automation (EDA) tools like Spyglass from the assignee verify the power architecture of an electronic design by comparing the power intent specification to the logic design and checking for coherence, correctness and the existence of necessary power-interface components.

As SoC designs continue to grow in terms of complexity and number of transistors, the verification time increases and the memory requirements of the EDA tools grow. Power verification is one of the last development activities before tape-out, so SoC developers are under pressure to complete it quickly. SoC developers would benefit greatly if the verification time could be reduced from days to hours.

SUMMARY DISCLOSURE

The hierarchical power verification system (HPVS) uses abstract models to make top level power verification much more efficient and thereby reduce power verification time. The HPVS creates abstract models of power behavior of modules that it successfully verifies. The abstract models simplify the module definition by omitting internal module details but provide sufficient information for power verification of higher level modules that incorporate this abstracted module. After replacing modules with abstracted models the HPVS can quickly verify an entire SoC with a small memory footprint. When a user modifies a module, the HPVS need only verify the changed module and related modules at higher levels of module hierarchy.

Specifically, the power verification system, comprises (a) a storage medium for receiving and storing a description of at least a portion of an electronic circuit design, and for receiving and storing a power intent file specifying a power architecture of power/voltage domains, their power supplies and any corresponding power devices of the electronic circuit design, and also for storing a report of power verification failures; (b) a processor having access to the storage medium and executing an application program for a hierarchical power verification tool that constructs, from the stored design description and power intent file, a set of abstract models of power behavior of circuit modules for use in higher level power verification of an electronic circuit design; and (c) a user interface including a computer display for displaying identified power verification failures and an input device for facilitating correction of at least one of the electronic circuit design and the power intent file.

According to the power verification method, the system's processor prepares the abstract models for each circuit module to be verified by performing in any order one or more of: (1) capture interface supplies, (2) create domains, (3) identify related supplies, (4) establish power state tables, (5) model isolation logic, (6) model level shifters, (7) model feed-through floating ports, and (8) model power switches. Design blocks are replaced with the abstract power models, resulting in reduced run-time and memory requirements. The power model may be expressed either in UPF or as a combination of liberty model and UPF. Any errors identified by the power verification are displayed on the system's computer display, while the input device facilitates correction and storage of at least one of the electronic circuit design and the power intent file.

DETAILED DESCRIPTION

The hierarchical power verification system (HPVS) uses abstract models to significantly reduce power verification time. The HPVS creates abstract models of modules that it successfully verifies. The abstract models simplify the module definition by omitting internal module details but provide sufficient information for power verification of higher level modules that incorporate this abstracted module. After replacing modules with abstracted models the HPVS can quickly verify an entire SoC with a small memory footprint. When a user modifies a module, the HPVS need only verify the changed module and related modules at higher levels of module hierarchy. In contrast, existing power verification systems have to verify the entire design after a change.

Figure 1:
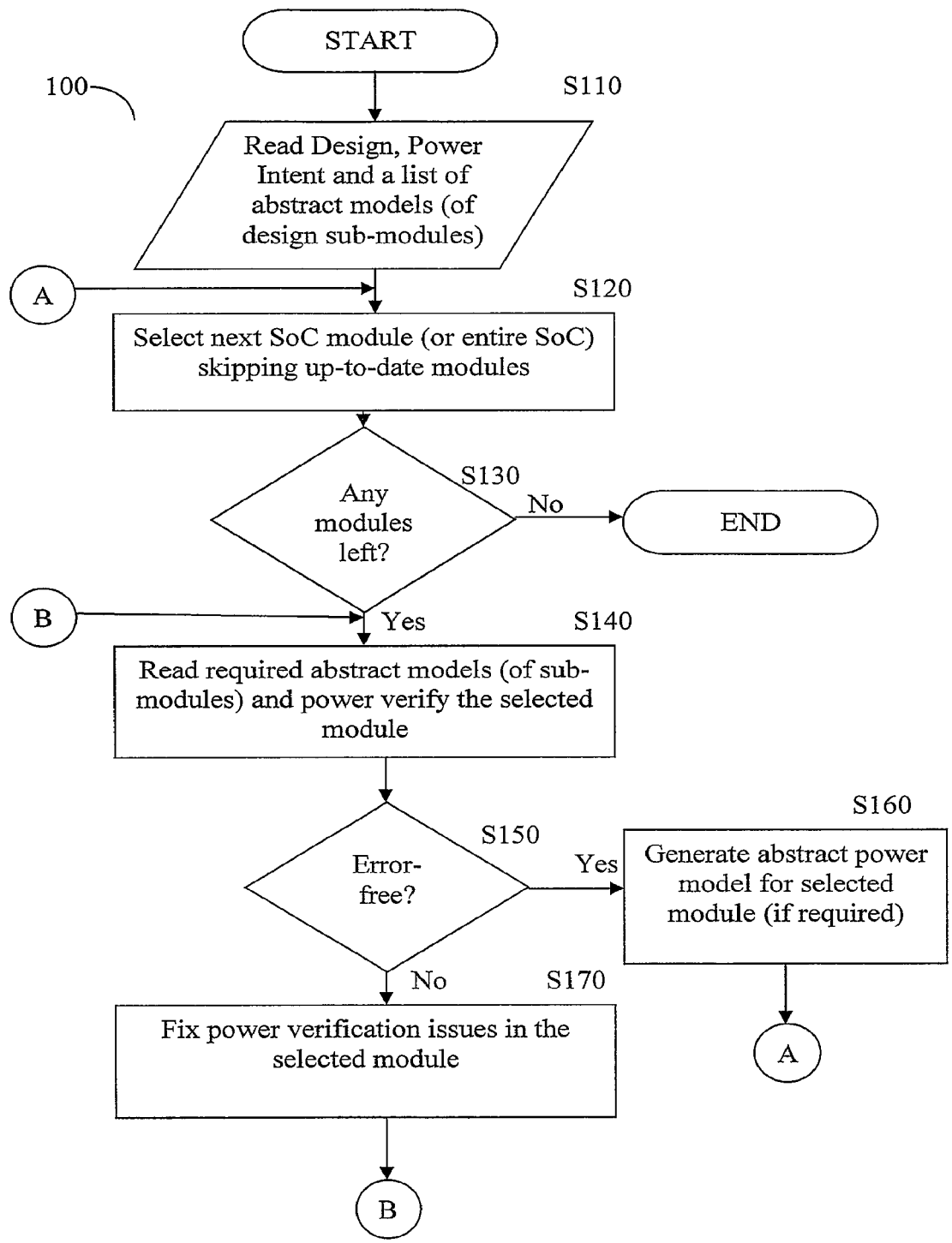
FIG. 1 shows an exemplary flowchart outlining the steps for using abstract models to significantly reduce power verification time.

FIG. 1 is an exemplary and non-limiting flowchart 100 showing how the hierarchical power verification system (HPVS) uses abstract models to significantly reduce power verification time. In S110 the HPVS reads the design, the power intent and a list of abstracted models of design sub-modules. The user of the HPVS specifies if the HPVS should verify a complete SoC design, a module of the SoC design or a set of modules from the SoC design. The logic design is typically specified in a hardware description language such as Verilog or VHDL. The corresponding power intent is typically specified in a power specification language such as UPF.

In S120 the HPVS selects the next module to verify. In one mode of operation the HPVS selects the next module from a list specified by a user. In a second mode of operation the HPVS automatically selects a module from the specified design. In either mode the HPVS detects whether the selected module has an up-to-date abstract model. If the module has been modified after the last abstract model was generated, the HPVS will need to process the module. If the HPVS detects an up-to-date abstract model it will skip processing that module. In S130 the HPVS checks if it has found a module to process. If the HPVS has finished processing all modules it terminates. If the HPVS find a module to process it continues at S140.

In S140 the HPVS determines if the selected module includes a module described by an abstract model. In one mode of operation the user explicitly specifies which abstract models to use for each module being checked. In a second mode of operation the HPVS automatically detects if the module includes a module described by an abstract model. The HPVS then performs power verification by comparing the power intent specification to the logic design and checking for coherence, correctness and the existence of necessary power-interface components.

In S150 the HPVS determines if the power verification found any errors. If the HPVS found one or more errors it proceeds to S170. If the HPVS did not find any errors it proceeds to S160. At S160 the HPVS generates an abstract model of the selected module and then proceeds to S120. At S170 the HPVS either fixes the power verification errors or asks a user to fix the power verification errors. The HPVS proceeds at S140 to re-verify the module. In one embodiment the HPVS exits when it finds an error and the user must fix the error and restart the HPVS.

Figure 2:
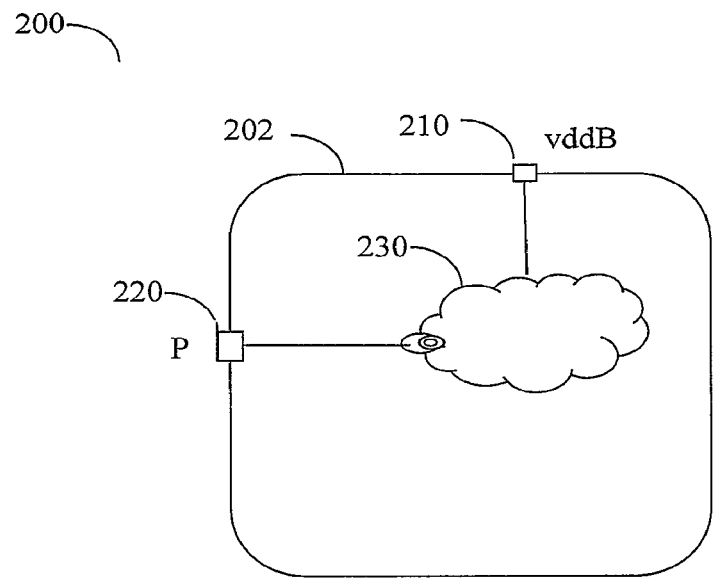
FIG. 2 shows a simple scenario to help explain model abstraction.

FIG. 2 shows a simple scenario 200 to help explain model abstraction. The scenario gives a visual representation of the power intent. Module 202 has a power supply vddB 210 and a logic port 220 that drives internal logic 230. The power supply vddB 210 controls the internal logic 230. We say that logic port 220 has related power supply vddB 210. An abstracted model will specify the module power supplies; the logic ports and the logic ports' related power supplies.

In scenario 200 the logic port 220 could have associated isolation logic. The power intent could have either of the following UPF statements associated with logic port 220:

```
set_isolation iso -location self
 -isolation_power_net VDDC
set_isolation iso -location parent
 -isolation_power_net VDDC
```

The first statement with "-location self" means that an abstract model must capture the fact that the port is isolated and has internal isolation logic. The second statement with "-location parent" means that an abstract model must capture the fact that the port has external isolation logic.

In scenario 200 the logic port 220 could have associated level-shifting logic. The power intent could have the following UPF statement associated with logic port 220:

```
set_level_shifter ls -type low_to_high
 -location self -input_supply_set ss1
```

The abstracted model must capture the level-shifting strategy and note the location of "self" or "parent".

Figure 3:
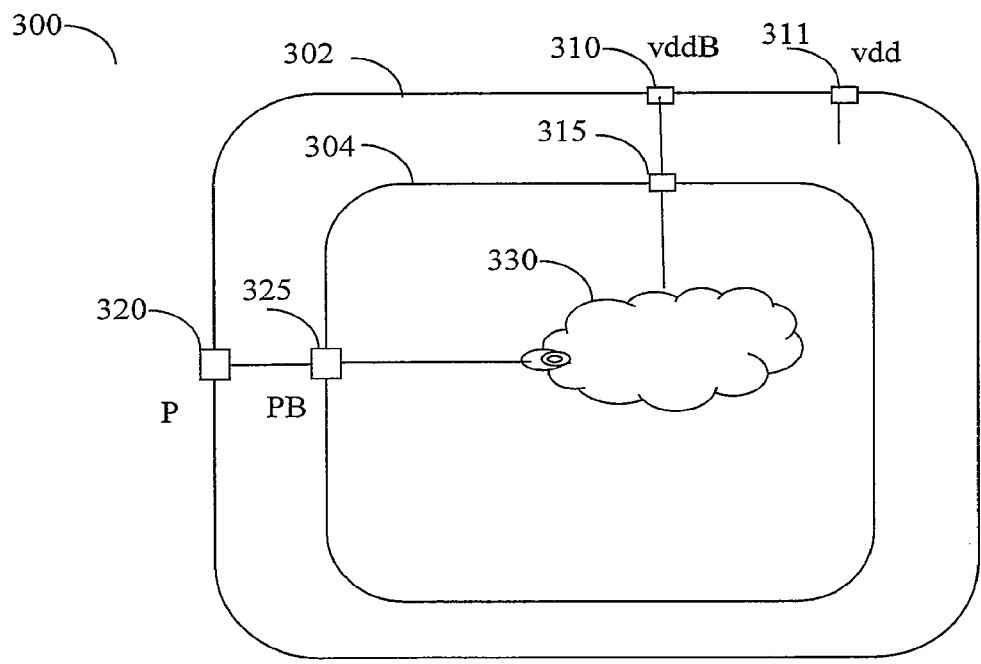
FIG. 3 shows a simple hierarchical module scenario to help explain model abstraction.

FIG. 3 shows a simple hierarchical module scenario 300 to help explain model abstraction. Module 302 includes module 304. Module 302 has primary power supply vdd 311. Module 304 has primary power supply vddB 310. Thus module 304 has a different power domain compared to module 302. Logic port P 320 of module 302 connects to logic port. PB 325 of module 304. Power supply port vddB 310 passes through module 302 and connects to power supply port 315 of module 304. Inside module 304 logic port PB 325 drives internal logic 330 that uses power supply port 315. Module 302 has logic port P 320 with related power supply port vddB 310.

In scenario 300 logic ports P 320 and PB 325 could each have associated isolation or level-shifting logic. The HPVS needs to decide to decide if the abstracted model of module 302 requires isolation and/or level-shifting properties.

Figure 4:
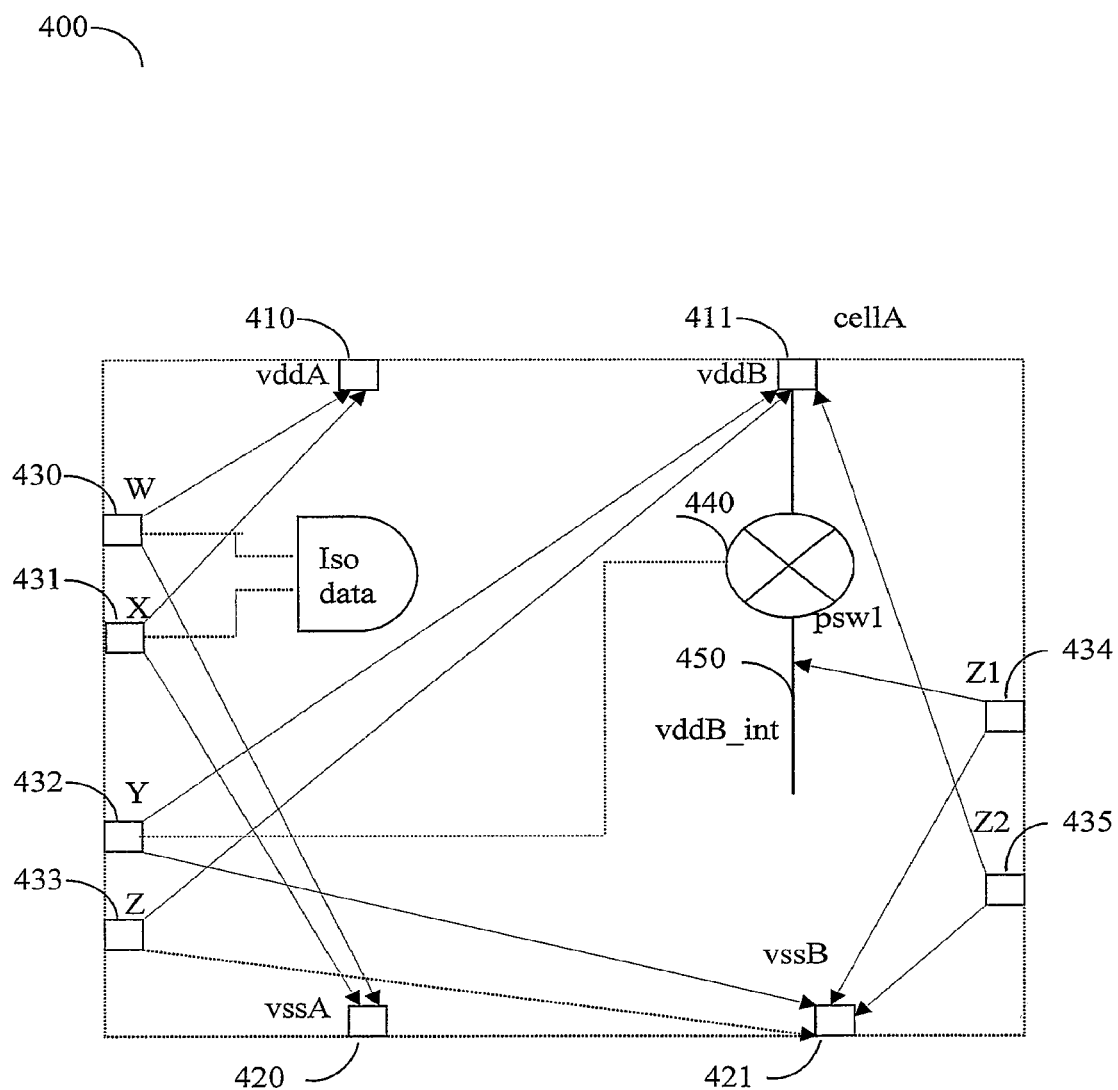
FIG. 4 shows an exemplary module with power intent.

FIG. 4 shows an exemplary module cellA 400 with power intent. Module cellA 400 has 2 power supplies vddA 410 and vddB 411. Module cellA 400 has 2 ground supplies vssA 420 and vssB 421.

The HPVS can create abstract models in a variety of formats, including: a) as a liberty file with auxiliary information in a UPF file; and b) as a UPF 2.1 power model. We refer to the UPF 2.1 model as a "full UPF" model. Liberty files are commonly used in the EDA industry to represent power and timing information of a module. In a) the liberty file is augmented with an auxiliary UPF file because the liberty file cannot represent all the needed attributes (such as Power State Tables—PSTs) for a complete abstraction of a module's Power Intent. In b) the full UPF based abstraction provides a flexible alternative for abstraction. This is because the UPF files are command based and software like. Users can view, understand and modify UPF easily if needed.

The power and ground power supplies vdda 410, vddB 411, vssA 420 and vssB 421 are modeled in pg_pin statements with pg_type attribute values of primary_power and primary_ground in a liberty model; as supply sets in a full UPF power model; and as supply nets in the auxiliary UPF.

Power supply port vddB 411 drives power switch psw1 440 which generates internal power supply net vddB_int 450. Power supply net vddB_int 450 is modeled as a pg_pin statement with direction internal in the liberty model; as a supply set in a full UPF power model and as supply nets in the auxiliary UPF. Power switch psw1 440 is modeled as a power switch with the same name in the UPF files. Port states are generated for the output supply port.

Input logic port Y 432 controls power switch psw1 440 which generates vddB_int 450. This aspect is captured in the UPF file. To model the power switch in the liberty file the HPVS does the following. The pg_pin statement for vddB_int 450 lists port Y 432 as the value of a switch_function attribute and port vddB 411 as the value of a pg_function attribute. The pg_pin statement for logic port Y 432 has attribute switch_pin with value true. Module level attribute switch_cell_type is specified in the liberty file.

Module cell A 400 has logic ports W 430, X 431, Y 432, Z 433, Z1 434 and Z2 435. Logic ports Z 433 employs level shifter strategy is with location parent. These are represented using set_level_shifter statements in the UPF files. Logic port X 431 employs an isolation strategy iso with location self. This is modeled using an is_isolated attribute on pin X in the liberty file and using a set_isolation statement in the full UPF.

Input logic ports W 430 and X 431 are related to power supply port vddA 410 and ground supply port vssA 420. These are modeled with the set_port_attribute statement with the "-receiver" option in the full UPF model. No information is required in the auxiliary UPF file.

Input logic ports Y 432 and Z 433 are related to power supply port vddB 411 and ground supply port vssB 421. They are modeled in the same way but with different power and ground supplies.

Output logic port Z1 has related supplies vddB_int 450 and vssB 421. These are modeled with a set_port_attribute statement with the -driver option in the full UPF model. Output logic port Z2 has related supplies vddB 411 and vssB 421. These are also modeled with a set_port_attribute statement with the -driver option in the full UPF model.

The completed abstracted models are shown below. The description of FIG. 5 explains how to build each portion of the abstraction.

Liberty File

```
/* Library definition */
library ( SpyGlass_Generated_Lib) {
/* Voltage map definition */
voltage_map(state1, 1.00);
voltage_map(state2, 0.00);
/* Cell definition */
cell ( top ) {
/* cell level attribute */
is_macro_cell : true;
switch_cell_type : fine_grain;
/* pg_pin definition */
pg_pin ( vddA ) {
voltage_name : state1;
pg_type : primary_power;
}
pg_pin ( vddB ) {
voltage_name : state1;
pg_type : primary_power;
}
pg_pin ( vssA ) {
voltage_name : state2;
pg_type : primary_ground;
}
pg_pin ( vssB ) {
voltage_name : state2;
pg_type : primary_ground;
}
/* Output net of the power switch being modeled as internal power */
pg_pin ( vddB_int ) {
voltage_name : state1;
pg_type : internal_power;
direction : internal;
pg_function : "vddB";
switch_function : "Y";
}
/* Signal pins definition */
pin ( W ) {
direction : input;
related_power_pin : vddA;
related_ground_pin : vssA;
}
pin ( X ) {
direction : input;
is_isolated : true; isolation_enable_condition : "W";
related_power_pin : vddA;
related_ground_pin : vssA;
}
pin ( Y ) {
direction : input;
switch_pin : true;
related_power_pin : vddB;
related_ground_pin : vssB;
}
pin ( Z ) {
direction : input;
related_power_pin : vddB;
related_ground_pin : vssB;
}
pin ( Z1 ) {
direction: output;
related_power_pin : vddB_int;
related_ground_pin : vssB;
}
pin ( Z2 ) {
direction : output;
related_power_pin : vddB;
related_ground_pin : vssB;
}
}
}
```

The corresponding auxiliary UPF file generated is as follows:

```
upf_version 1.0
#Domain creation
```

-continued

```
create_power_domain PD -include_scope
#Supply net and port creation
create_supply_port vddA
create_supply_net vddA -domain PD
connect_supply_net vddA -ports vddA
add_port_state vddA -state {off off}
add_port_state vddA -state {on 1.00}
create_supply_port vddB
create_supply_net vddB -domain PD
connect_supply_net vddB -ports vddB
add_port_state vddB -state {off off}
add_port_state vddB -state {on 1.00}
create_supply_port vssA
create_supply_net vssA -domain PD
connect_supply_net vssA -ports vssA
add_port_state vssA -state {on 0.00}
create_supply_port vssB
create_supply_net vssB -domain PD
connect_supply_net vssB -ports vssB
add_port_state vssB -state {on 0.00}
create_supply_net vddB_int
#Domain primary supply definition
set_domain_supply_net PD \
-primary_power_net vddB \
-primary_ground_net vssB
#Level shifter strategy definition
set_level_shifter ls -domain PD -rule low_to_high
-location parent -elements { Z }
#Power switch modelling
create_power_switch psw -domain PD
-output_supply_port { vddB_int vddB_int }
-input_supply_port { vddB vddB }
-control_port { Y Y }
add_port_state psw/vddB_int -state {off off}
add_port_state psw/vddB_int -state {on 1.00}
#Power State definition
create_pst pst -supplies { vddA vddB vssA vssB vddB_int }
add_pst_state s1 -pst pst -state {off off on on off}
add_pst_state s2 -pst pst -state {on off on on off}
add_pst_state s3 -pst pst -state {on on on on off}
add_pst_state s4 -pst pst -state {on on on on on}
```

The full UPF will be as follows:

```
upf_version 2.1
begin_power_model upf_top -for { top }
#Supply net and port creation
create_supply_port vddA
create_supply_net vddA
connect_supply_net vddA -ports vddA
add_port_state vddA -state {off off}
add_port_state vddA -state {on 1.00}
create_supply_port vddB
create_supply_net vddB
connect_supply_net vddB -ports vddB
add_port_state vddB -state {off off}
add_port_state vddB -state {on 1.00}
create_supply_port vssA
create_supply_net vssA
connect_supply_net vssA -ports vssA
add_port_state vssA -state {on 0.00}
create_supply_port vssB
create_supply_net vssB
connect_supply_net vssB -ports vssB
add_port_state vssB -state {on 0.00}
create_supply_net vddB_int
#Supply set creation
create_supply_set ss1 -function { ground vssA }
-function { power vddA }
create_supply_set ss2 -function { ground vssB }
-function { power vddB }
create_supply_set ss3 -function { ground vssB }
-function { power vddB_int }
#Power domain creation
create_power_domain PD_top -include_scope \
-supply { ssh_1 ss1 } \
-supply { primary ss2 } \
```

-continued

```
-supply { ssh_3 ss3 }
#Adding port attributes
set_port_attributes -ports { Y Z }
-receiver_supply PD_top.primary
set_port_attributes -ports { W X }
-receiver_supply PD_top.ssh_1
set_port_attributes -ports { Z2 }
-driver_supply PD_top.primary
set_port_attributes -ports { Z1 }
-driver_supply PD_top.ssh_3
#Isolation strategy
set_isolation iso -domain PD_top -elements {X}
-isolation_supply_set ss1 -isolation_signal W
-clamp_value 0 -isolation_sense low -location self
#Level shifter strategy
set_level_shifter ls -domain PD_top
-rule low_to_high -location parent -elements { Z }
#Power switch modelling
create_power_switch psw -domain PD_top
-output_supply_port { vddB_int vddB_int }
-input_supply_port { vddB vddB }
-control_port { Y Y }
add_port_state psw/vddB_int -state {off off}
add_port_state psw/vddB_int -state {on 1.00}
#Power State definition
create_pst pst -supplies { vddA vddB vssA vssB vddB_int }
add_pst_state s1 -pst pst -state {off off on on off}
add_pst_state s2 -pst pst -state {on off on on off}
add_pst_state s3 -pst pst -state {on on on on off}
add_pst_state s4 -pst pst -state {on on on on on}
end_power_model
```

Figure 5:
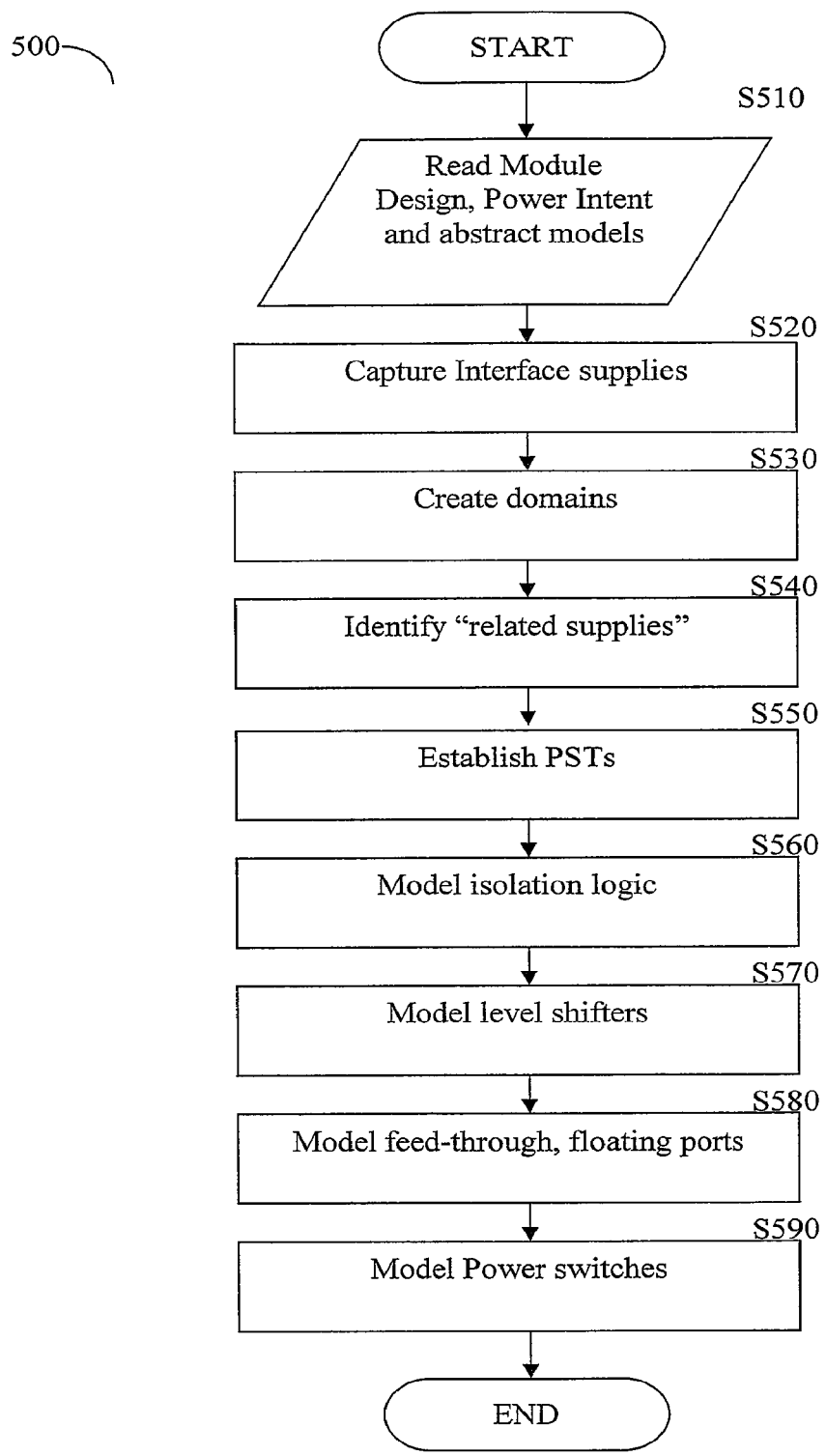
FIG. 5 shows an exemplary flowchart outlining the steps for generating an abstract model.

FIG. 5 shows an exemplary flowchart 500 outlining the steps for generating an abstract model. These steps can be performed in a different order to those shown in flowchart 500. In S510 the HPVS reads the design, the power intent and any related abstract models.

In S520 the HPVS captures the interface supplies as follows:

1. For each supply net connected to a top level supply port specified in the UPF or in the design, create a corresponding pg_pin statement in the liberty file and a create_supply_port statement in the UPF with the same name as that of the connected supply net.

```
#liberty file
pg_pin ( vddA ) {
  voltage_name : state1;
  pg_type : primary_power;
}
#UPF create_supply_port vddA
```

2. Generate port states (using the add_port_state statement) for each modeled supply port mentioned in the input UPF.

```
#UPF
add_port_state vddA -state {off off}
add_port_state vddA -state {on 1.00}
```

3. For every modeled supply port create a supply net with the same name and add a connect_supply_net_statement for the corresponding port and net pair.

```
#UPF
create_supply_net vddA
connect_supply_net vddA -ports vddA
```

4. For the liberty+Auxiliary UPF Flow: Generate voltage_map statements for every unique non-off port state. Each pg_pin statement (shown in step 1 above) will have a voltage_name attribute set to one of the voltage_map values that corresponds to the voltage specified in the UPF.

```
#liberty
voltage_map(state1, 1.00);
voltage_map(state2, 0.00);
```

In the auxiliary UPF, add -domain field for the supply net statements 'create_supply_net' (for compatibility with UPF 1.0).

```
#Aux UPF
create_supply_net vddA -domain PD
```

5. For full UPF flow: Add supply set for combinations of power and ground supplies that are inferred as related supplies of signal pins.

```
#Full UPF
create_supply_set ss1 -function { ground vssA }
-function { power vddA }
create_supply_set ss2 -function { ground vssB }
-function { power vddB }
create_supply_set ss3 -function { ground vssB }
-function { power vddB_int }
```

In S530 the HPVS creates power domains as follows:

1. The HPVS creates one domain in the UPF corresponding to the top domain in the input UPF.

```
#Aux UPF
create_power_domain PD -include_scope
```

2. In the auxiliary UPF, the HPVS generates a set_domain_supply_net statement.

```
#Aux UPF
set_domain_supply_net PD \
-primary_power_net vddB \
-primary_ground_net vssB
```

3. In the full UPF, the HPVS creates a supply set with the power and ground handles and adds the -supply attribute with primary handle in the create_power_domain statement.

```
#Full UPF
create_power_domain PD_top -include_scope \
-supply { ssh_1 ss1 } \
-supply { primary ss2 } \
-supply { ssh_3 ss3 }
```

In all cases, the primary power and primary ground supplies of the domain will be the same as those provided in the input UPF.

In S540 the HPVS identifies each top level interface port's "related supplies" using the steps below. The first three steps identify the "related supplies" of logic ports, while the last two steps codify the information in the full UPF file:

1. The HPVS does a depth first traversal from the top level interface port, skipping all the nested domain boundary ports that do not have a level shifter strategy specified.

2. If the destination is a leaf cell, the HPVS sets the related supplies (power and ground) of the top level interface port to be the supply powering the leaf level destination logic.

3. If the destination is a nested domain boundary port (having a level shifter strategy) then the related supplies are the input supplies of the level shifter on the input side and output supplies of the level shifter on the output side. For a top level interface port with level shifter strategy, the "related supplies" will be same as in Step 2.

4. In the liberty file, the HPVS sets the related_power_pin and related_ground_pin based on these related supplies. No information need be added to the auxiliary UPF.

```
#liberty
pin ( W ) {
direction : input;
related_power_pin : vddA;
related_ground_pin : vssA;
}
```

5. In the full UPF, the HPVS adds create_supply_set statements for each of these related supplies and sets the driver/receiver supply of the ports to the respective supply set.

```
#full UPF
set_port_attributes -ports { Y Z }
-receiver_supply PD_top.primary
set_port_attributes -ports { W X }
-receiver_supply PD_top.ssh_1
set_port_attributes -ports { Z2 }
-driver_supply PD_top.primary
set_port_attributes -ports { Z1 }
-driver_supply PD_top.ssh_3
```

In S550 the HPVS establishes the PST including supply port states. The HPVS generates a merged PST for the complete module. The generated PST only contains the supplies generated during identification of related supplies for the design pins.

```
#UPF
create_pst pst -supplies { vddA vddB vssA vssB vddB_int }
add_pst_state s1 -pst pst -state {off off on on off}
add_pst_state s2 -pst pst -state {on off on on off}
add_pst_state s3 -pst pst -state {on on on on off}
add_pst_state s4 -pst pst -state {on on on on on}
```

In S560 the HPVS handles isolation logic for each logic port. Isolation logic is modeled in the liberty file using the is_isolated attribute while the UPF requires isolation strategies. The HPVS uses the following steps to generate UPF:

1. If an isolation strategy is specified on the top-level interface port with location as parent, then add a corresponding isolation strategy in the UPF file (both aux and full).

2. If an isolation strategy is specified on the top-level interface port with location as self then add a corresponding isolation strategy in the Full UPF file only.

3. For any isolation strategy on a nested domain boundary port, there is no need to add strategy in the UPF files. They will be represented by is_isolated attribute in the LIB file The HPVS uses the following steps to generate is_isolated in liberty file:

1. Do a depth first traversal from the top-level interface port, skipping every nested domain boundary port that does not have either isolation or level shifter strategy specified.

2. If a nested domain boundary port is found with a level shifter strategy then stop and move onto the next logic port.

3. If a nested domain boundary port with isolation strategy specified is found, then set the is_isolated attribute for the pin to true. For this pin also set the isolation_enable_condition to the resolved isolation_signal attribute of set_isolation statement.

```
#liberty
pin ( X ) {
  direction : input;
  is_isolated : true;
  isolation_enable_condition : "W";
  related_power_pin : vddA;
  related_ground_pin : vssA;
}
```

In S570 the HPVS handles level shifter logic for each logic port. If a level shifter strategy is specified on the top-level interface port then add a corresponding strategy in the UPF file (both aux and full) using the set_level_shifter statement. If there is any strategy on a nested domain boundary port, then the HPVS does not have to add those in the UPF file as they will be handled using related_power_pin and related_ground_pin attributes of the pin statement.

```
#Full UPF
set_level_shifter ls -domain PD_top
-rule low_to_high -location parent \
-elements { Z }
#Aux UPF
set_level_shifter ls -domain PD -rule low_to_high
-location parent \
-elements { Z }
```

In S580 the HPVF handles feed-through and floating ports by processing each logic port. The HPVS uses the following steps to handle feed-through:

1. For a top-level interface output port, do a backward depth first traversal, skipping nested domain boundary ports that do not have an isolation/level shifter strategy.

2. If the destination is not an interface input port, then do nothing and move onto the next logic port.

3. If destination is an interface input port, and an isolation/level-shifter strategy is specified on any of the ports, then do nothing and move onto the next logic port.

4. Set the attribute "function" to the name of the interface input port with polarity determined by counting inverters in the path. In the full UPF add set_port_attributes {input-port output-port}-feedthrough for the interface input and output ports.

```
#liberty (not from the above example)
pin ( Z1 ) {
  direction: output; related_power_pin : vddA;
  related_ground_pin : vssA;
  function : W;
}
```

If a port is not connected to a net (i.e., it is floating), then create a corresponding pin and set the related supplies to the primary supply of the domain.

In S590 the HPVS handles Power switches. If the related supply of an interface port that the HPVS inferred is the output supply of a power switch, then the HPVS models that power switch. For the liberty model, the HPVS uses the following steps:

1. In the pg_pin statement corresponding to the output of the power switch, set the pg_function to the name of the pg_pin corresponding to the input supply net.

2. Set the direction of this pg_pin to internal and pg_type as internal power.

3. Set the switch_function attribute of this pg_pin to the pin name which is driving the pin specified in the control_port attribute of the corresponding create_power_switch statement.

4. For the pin that is driving the control port of the power switch set the switch_pin attribute to true.

5. Add the attribute switch_cell_type with value as fine_grain in the cell block.

```
#liberty is macro_cell : true;
switch_cell_type : fine_grain;
pg_pin ( vddB_int ) {
  voltage_name : state2;
  pg_type : internal_power;
  direction : internal;
  pg_function : "vddB" ;
  switch_function : "Y";
}
pin ( Y ) {
  direction : input;
  switch_pin : true;
  related_power_pin : vddB;
  related_ground_pin : vssB;
}
```

For the full and auxiliary UPF model, the HPVS uses the following steps:

1. Generate a corresponding power switch statement as specified in the input UPF with the names of domain, input_supply_port, output_supply_port, control_port, etc. resolved to the ones we have generated.

2. Generate add_port_state statements for the output port of the power switch, with the states same as that of the output supply net.

```
#UPF
create_power_switch psw -domain PD_top \
-output_supply_port { vddB_int vddB_int } \
- input_supply_port { vddB vddB }
-control_port { Y Y }
add_port_state psw/vddB_int -state {off off}
add_port_state psw/vddB_int -state {on 1.00}
```

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

Figure 6:
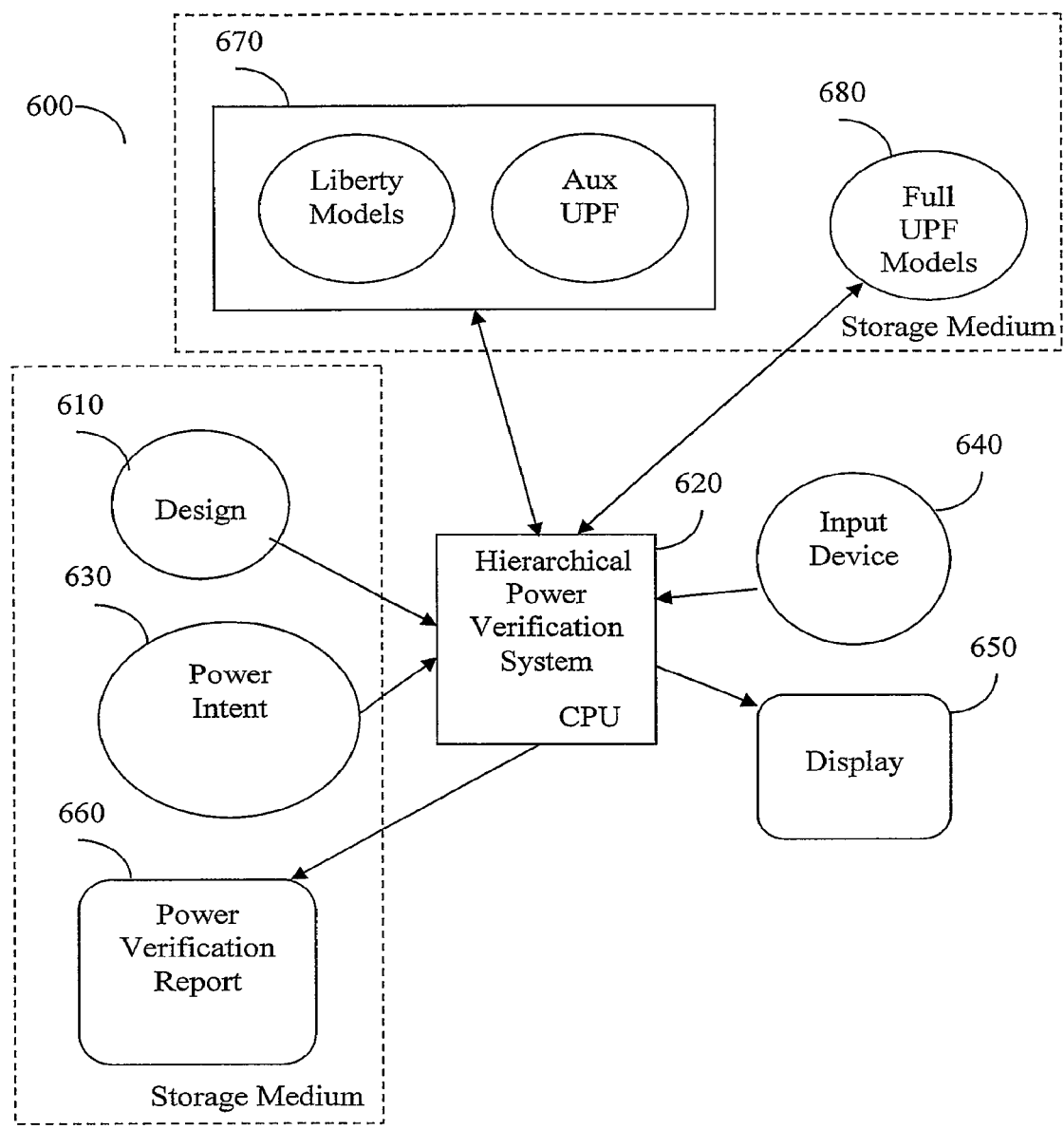
FIG. 6 shows an exemplary system for hierarchical power verification.

FIG. 6 shows an exemplary system 600 for hierarchical power verification. The HPVS 620 runs as an application program on a central processing unit (CPU). The HPVS 620 interacts with an end-user through an input device 640 and a display 650. The HPVS 620 displays power verification results on the display, 650. An end-user specifies HPVS inputs, starts the HPVS 620 and views results using the input device, 640 and display 650. An end-user views power verification results on the display 650. The HPVS 620 reads a design 610 and power intent 630. The design 610 is typically described in a hardware description language such as Verilog or VHDL. The power intent 630 is typically described in a power description language such as UPF. The HPVS 620 reads and writes abstract models stored in either liberty model files with auxiliary UPF 670 or full UPF model files 680. The design 610, power intent 630 and abstract models 670 and/or 680 are stored in files on a computer storage device. In one embodiment the HPVS 620 stores the power verification results in a file as a report 660.

What is claimed is:

1. A method implemented by a computer system comprising a power verification tool, the method for verifying a power behavior of a module in a circuit design, the method comprising:
    reading the hierarchical circuit design and a power intent file of the hierarchical circuit design, wherein the hierarchical circuit design specifies that the module includes one or more sub-modules and the power intent file specifies a power architecture of power/voltage domains, power supplies and corresponding power devices of the circuit design, and each sub-module may have a corresponding abstracted power model created as a result of an earlier power verification of the sub-module, where the abstracted power model describes a power behavior of the sub-module while omitting internal logic of the sub-module;
    for each sub-module, determining whether a corresponding up-to-date abstracted power model exists;
    verifying the power behavior of the module by (a) using the up-to-date abstracted power models for those sub-modules with up-to-date abstracted power models; and (b) verifying the power behavior of those sub-modules without up-to-date abstracted power models;
    creating abstracted power models for those sub-modules for which their power behavior was verified under step (b) above, the abstracted power models created by performing in any order one or more of: (1) capturing interface supplies, (2) creating power domains, (3) identifying related supplies, (4) establishing power state tables, (5) modeling isolation logic, (6) modeling level shifters, (7) modeling feed-through floating ports, and (8) modeling power switches; and
    making the created abstracted power models for sub-modules available for later power verification of modules that contain the sub-modules.

2. The computer-implemented method of claim 1 wherein:
    creating the abstracted power models for the sub-modules comprises capturing interface supplies; and
    capturing interface supplies is performed by identifying supply ports, generating port states for the supply ports, generating voltage maps for the port states, and creating supply nets for the supply ports.

3. The computer-implemented method of claim 1 wherein:
    creating abstracted power models for the sub-modules comprises creating power domains; and
    creating power domains includes specifying a top domain and specifying key supply nets for the top domain.

4. The computer-implemented method of claim 1 wherein:
    creating abstracted power models for the sub-modules comprises identifying related supplies; and
    identifying related supplies is performed by a depth first traversal from a top level interface port, skipping all nested domain boundary ports that do not have a level shifter strategy specified; if the destination is a leaf cell, setting the related supply as that powering the leaf cell; and if the destination is a nested domain boundary port having a level shifter strategy, setting the related supplies as those supplying that boundary port's level shifter on input and output sides.

5. The computer-implemented method of claim 1 wherein:
    creating abstracted power models for the sub-modules comprises establishing power state tables; and
    establishing power state tables contains only supplies generated during an identification of related supplies.

6. The computer-implemented method of claim 5 wherein the power state tables are merged for each sub-module that is a complete module.

7. The computer-implemented method of claim 1 wherein:
    creating abstracted power models for the sub-modules comprises modeling isolation logic; and
    modeling isolation logic entails specifying isolation strategies, attributes at the logic port for isolation present at top level logic ports, or both; for isolation present at nested domain boundary ports, modeling performed by: a depth first traversal from a top-level logic port, skipping every nested domain boundary port that has neither level shifter nor isolation strategy specified; if a nested domain boundary port is found with a level shifter strategy, then moving onto a next logic port; and if a nested domain boundary port is found with isolation strategy specified, then setting an isolated attribute for that port to true.

8. The computer-implemented method of claim 1 wherein:
    creating abstracted power models for the sub-modules comprises modeling level shifters; and
    modeling level shifters is performed for each top level logic port having a level strategy specified.

9. The computer-implemented method of claim 1 wherein:
    creating abstracted power models for the sub-modules comprises modeling feed-through and floating ports; and
    modeling feed-through and floating ports is performed by a backward depth first traversal, skipping nested domain boundary ports that have neither level shifter nor isolation strategy specified; if a destination is not an interface port, then doing nothing; if a destination is an interface input port with level shifter or isolation strategy specified on any port in the traversal path, then doing nothing; otherwise set interface input port attribute function as feedthrough; and if a port is not connected to a net, then creating a corresponding pin and setting related supplies to the primary supply of its power domain.

10. The computer-implemented method of claim 1 wherein:
creating abstracted power models for the sub-modules comprises modeling power switches; and
modeling power switches includes specifying input supply port, output supply port and switch control port; together with specifying the port states of the output supply port; and is done only when an interface port has a related supply which is the output of a power switch.

11. The computer-implemented method of claim 1 wherein the abstracted power models are represented in any one or more of: (a) liberty files with auxiliary attributes, including power state tables, being specified in a power specification language, or (b) a full power-specification-language based file.

12. The computer-implemented method of claim 1 wherein the abstracted power models are expressed as any one or more of: (a) UPF, or (b) a combination of liberty model and UPF.

13. The computer-implemented method of claim 1 wherein the module is a top-level module in the hierarchical design.

14. The computer-implemented method of claim 1 wherein the method is repeated for all modules in the hierarchical design that are without a corresponding up-to-date abstracted power model.

15. The computer-implemented method of claim 14 wherein, after the method is completed for all such modules, up-to-date abstracted power models exist for all modules in the hierarchical design.

16. The computer-implemented method of claim 1 further comprising:
displaying on a display of the computer system, any errors identified by the power verification; and using an input device to facilitate correction of at least one of the hierarchical circuit design and the power intent file.

17. The computer-implemented method of claim 1 further comprising:
receiving a user input that identifies the module to be power verified.

18. The computer-implemented method of claim 1 wherein:
receiving a user input that identifies modules for which the corresponding abstracted power models are created.

19. A non-transitory computer-readable storage medium storing executable computer program instructions for verifying a power behavior of a module in a hierarchical circuit design, the instructions executable by a processor and causing the processor to perform a method comprising:
reading the hierarchical circuit design and a power intent file of the hierarchical circuit design, wherein the hierarchical circuit design specifies that the module includes one or more sub-modules and the power intent file specifies a power architecture of power/voltage domains, power supplies and corresponding power devices of the circuit design, and each sub-module may have a corresponding abstracted power model created as a result of an earlier power verification of the sub-module, where the abstracted power model describes a power behavior of the sub-module while omitting internal logic of the sub-module;
for each sub-module, determining whether a corresponding up-to-date abstracted power model exists;
verifying the power behavior of the module by (a) using the up-to-date abstracted power models for those sub-modules with up-to-date abstracted power models; and (b) verifying the power behavior of those sub-modules without up-to-date abstracted power models;
creating abstracted power models for those sub-modules for which their power behavior was verified under step (b) above, the abstracted power models created by performing in any order one or more of: (1) capture interface supplies, (2) create power domains, (3) identify related supplies, (4) establish power state tables, (5) model isolation logic, (6) model level shifters, (7) model feed-through floating ports, and (8) model power switches; and
making the created abstracted power models for sub-modules available for later power verification of modules that contain the sub-modules.

20. A power verification system for verifying a power behavior of a module in a hierarchical circuit design, the system comprising:
a storage medium for receiving and storing the hierarchical circuit design and a power intent file of the hierarchical circuit design, wherein the hierarchical circuit design specifies that the module includes one or more sub-modules and the power intent file specifies a power architecture of power/voltage domains, power supplies and corresponding power devices of the circuit design, and each sub-module may have a corresponding abstracted power model created as a result of an earlier power verification of the sub-module, where the abstracted power model describes a power behavior of the sub-module while omitting internal logic of the sub-module; and
a processor having access to the storage medium and executing an application program for a hierarchical power verification tool, wherein the processor executing the application program:
for each sub-module, determines whether a corresponding up-to-date abstracted power model exists;
verifies the power behavior of the module by (a) using the up-to-date abstracted power models for those sub-modules with up-to-date abstracted power models; and (b) verifying the power behavior of those sub-modules without up-to-date abstracted power models;
creates abstracted power models for those sub-modules for which their power behavior was verified under step (b) above, the abstracted power models created by performing in any order one or more of: (1) capture interface supplies, (2) create power domains, (3) identify related supplies, (4) establish power state tables, (5) model isolation logic, (6) model level shifters, (7) model feed-through floating ports, and (8) model power switches; and
makes the created abstracted power models for sub-modules available for later power verification of modules that contain the sub-modules.

\* \* \* \* \*